US007617112B2

(12) United States Patent
Harrison, Jr.

(10) Patent No.: US 7,617,112 B2
(45) Date of Patent: Nov. 10, 2009

(54) POSTAL SYSTEM, METHOD AND DEVICE

(76) Inventor: Shelton E. Harrison, Jr., 6225 Canterbury Dr. #105, Culver City, CA (US) 90230

( * ) Notice: Subject to any disclaimer, the term of this patent is extended or adjusted under 35 U.S.C. 154(b) by 429 days.

(21) Appl. No.: 11/374,241

(22) Filed: Mar. 13, 2006

(65) Prior Publication Data

US 2007/0046019 A1 Mar. 1, 2007

Related U.S. Application Data

(60) Provisional application No. 60/712,215, filed on Aug. 29, 2005.

(51) Int. Cl.
*G06Q 10/00* (2006.01)
*G06Q 30/00* (2006.01)

(52) U.S. Cl. ........................................................ 705/1

(58) Field of Classification Search ...................... 705/1
See application file for complete search history.

(56) References Cited

U.S. PATENT DOCUMENTS

| | | | | |
|---|---|---|---|---|
| 4,410,962 | A | 10/1983 | Daniels et al. | |
| 4,569,022 | A | 2/1986 | Coppola et al. | |
| 4,574,352 | A | 3/1986 | Coppola et al. | |
| 4,773,042 | A | 9/1988 | Edwards | |
| 5,025,386 | A | 6/1991 | Pusic | |
| 5,035,515 | A * | 7/1991 | Crossman et al. | 383/38 |
| 5,065,000 | A | 11/1991 | Pusic | |
| 5,325,303 | A | 6/1994 | Walz et al. | |
| 5,369,258 | A | 11/1994 | Sansone et al. | |
| 5,420,403 | A | 5/1995 | Allum et al. | |
| 5,457,636 | A | 10/1995 | Sansone et al. | |
| 5,493,564 | A * | 2/1996 | Mullan | 370/351 |
| 5,684,705 | A | 11/1997 | Herbert | |
| 5,737,729 | A | 4/1998 | Denman | |
| 5,826,246 | A | 10/1998 | Bator et al. | |
| 5,924,737 | A * | 7/1999 | Schrupp | 283/58 |
| 5,943,658 | A | 8/1999 | Gravell et al. | |
| 5,946,672 | A | 8/1999 | Chrosny et al. | |
| 6,055,520 | A | 4/2000 | Heiden et al. | |
| 6,078,848 | A | 6/2000 | Bernstein et al. | |
| 6,089,612 | A | 7/2000 | Tsamourgelis | |
| 6,289,323 | B1 * | 9/2001 | Gordon et al. | 705/40 |
| 6,361,078 | B1 * | 3/2002 | Chess | 283/81 |
| 6,783,063 | B2 | 8/2004 | Holden | |
| 6,826,447 | B2 | 11/2004 | Divine et al. | |
| 6,970,856 | B1 | 11/2005 | Heiden et al. | |
| 2001/0014164 | A1 | 8/2001 | Daniels et al. | |
| 2001/0049745 | A1 | 12/2001 | Schoeffler | |
| 2002/0057824 | A1 | 5/2002 | Andreasson | |
| 2002/0087493 | A1 | 7/2002 | Herbert | |

(Continued)

OTHER PUBLICATIONS

"Sales Online Direct Launches AI Commerce Storefront to Offer Merchatns an Easy Turnkey Solution for Creating Their Own Branded Web Site." Newswire. Feb 21, 2002.*

(Continued)

*Primary Examiner*—John W Hayes
*Assistant Examiner*—Allen J Jung

(57) ABSTRACT

A disclosed shipping method allows a sender to send a physical letter or package through a regular postal mail service, said letter or package being addressed simply to an e-mail address (such as "anyone@example.com"). Licensing information may be obtained through http://www.inventerprise.com.

20 Claims, 14 Drawing Sheets

U.S. PATENT DOCUMENTS

| | | | | |
|---|---|---|---|---|
| 2002/0087647 | A1 * | 7/2002 | Quine et al. | 709/206 |
| 2002/0103697 | A1 * | 8/2002 | Lockhart et al. | 705/14 |
| 2002/0156643 | A1 * | 10/2002 | Nagasaka | 705/1 |
| 2002/0156645 | A1 | 10/2002 | Hansen | |
| 2002/0184064 | A1 | 12/2002 | Schnurmann et al. | |
| 2003/0004893 | A1 * | 1/2003 | Blaesche | 705/64 |
| 2003/0009351 | A1 | 1/2003 | Wade | |
| 2003/0020747 | A1 | 1/2003 | Korala | |
| 2003/0046103 | A1 | 3/2003 | Amato et al. | |
| 2003/0074324 | A1 | 4/2003 | Kresina et al. | |
| 2003/0163470 | A1 | 8/2003 | Wadley | |
| 2003/0182018 | A1 | 9/2003 | Snapp | |
| 2004/0010430 | A1 | 1/2004 | Cinquini et al. | |
| 2004/0013454 | A1 | 1/2004 | Manduley | |
| 2004/0015453 | A1 | 1/2004 | Youngblood et al. | |
| 2004/0030722 | A1 * | 2/2004 | Garey | 707/104.1 |
| 2004/0044734 | A1 * | 3/2004 | Beck | 709/206 |
| 2004/0055790 | A1 * | 3/2004 | Gerstenberg et al. | 177/1 |
| 2004/0076544 | A1 | 4/2004 | Dao | |
| 2004/0083189 | A1 | 4/2004 | Leon | |
| 2004/0088268 | A1 | 5/2004 | Mayes | |
| 2004/0117317 | A1 | 6/2004 | Feinman | |
| 2004/0230565 | A1 | 11/2004 | Burke | |
| 2005/0108111 | A1 | 5/2005 | Kranyec | |
| 2005/0137916 | A1 | 6/2005 | McElhannon | |
| 2005/0192913 | A1 | 9/2005 | Lubart | |
| 2005/0211764 | A1 | 9/2005 | Barcelou | |
| 2005/0240508 | A1 * | 10/2005 | Chien | 705/37 |

OTHER PUBLICATIONS

Lewis, Bill; "Automated Postal Centers", Postal Automation Discussion (www.lunewsviews.com/self-service.htm), unknown date, unknown city.

Unknown Author; "New Automated Postal Kiosk . . . " Codecode (www.codecode.litchinut.com), Dec. 20, 2004, unknown city.

Prager, Jason; "Automated postal Kiosk to handle overnight . . . " Tennessean.com, Jan. 20, 2006, TN.

Unknown Author. "Current Security News," (www.aaae.org/government/), Jul. 12, 2005, unknown city.

* cited by examiner

©2003-2006 Inventerprise® Invengineer™ Patent Illustrations

©2003-2006 Inventerprise® Invengineer™ Patent Illustrations

©2003-2006 Inventerprise® Invengineer™ Patent Illustrations

POSTAL SYSTEM, METHOD AND DEVICE

CROSS-REFERENCE TO RELATED APPLICATIONS

Priority filing of U.S. provisional patent application 60/712,215, filing date Aug. 29, 2005, entitled "Universal Electronic Transaction System Improvements," is claimed. Said provisional patent application is hereby incorporated by reference in it entirety into the present disclosure.

A portion of the disclosure of this patent document contains material which is subject to copyright protection. The copyright owner has no objection to the facsimile reproduction by anyone of the patent documents or patent disclosure, as it appears in the patent and trademark office patent file or records, but otherwise reserves all rights whatsoever.

The inventor wishes to thank the faculty and staff of Memphis University School.

STATEMENT REGARDING FEDERALLY SPONSORED RESEARCH AND DEVELOPMENT

None.

REFERENCE TO SEQUENCE LISTING, A TABLE OR A COMPUTER PROGRAM LISTING APPENDIX

None

BACKGROUND OF THE INVENTION

1. Field of the Invention

The present invention relates to postal, shipping and lookup services and electronic commerce.

2. Description of the Related Art

Under the related art, a sender of a letter or package by postal mail must address the item with a physical address, i.e., name, street or P.O. Box, city, state and zip code. This requirement is not ideal in that people often move from one dwelling or office to another, and at least a few people, particularly those with whom correspondence is rare, are not made aware of the new physical address. Moreover, memorizing all the details of a physical address is not easy, and the necessity of carrying, maintaining and referring to an address book is not convenient.

What is needed, therefore, is a more convenient system for addressing letters and packages.

Under the related art, user-to-user e-commerce transactions, as in the case of Internet auctions, suffer from high transaction costs that reduce the attractiveness of this sales avenue for the occasional seller. Specifically, even if one sells a very cheap item, such as a five-dollar book, one must ship the item by some mechanism that provides proof of shipping in order to protect oneself from claims that the item was never shipped. Such proof requires use of a private carrier, which is very expensive, or a trip to the post office, which is typically very time-consuming. Under either option, the time and expense involved negates any realistic profit to be made from a five-dollar sale.

What is needed, therefore, is a more efficient system for conducting user-to-user e-commerce.

Under the related art, massive "over-shipping" occurs in user-to-user transactions. For example, a seller in Los Angeles offers a used copy of *Catch*-22 for sale by Internet auction. Sometime later, an unrelated seller in New York also offers a used copy of *Catch*-22. A buyer bids on and wins the first auction. The seller in Los Angeles dutifully ships a used copy of *Catch*-22 a distance of 3000 miles, while an essentially identical item is available two miles away from the buyer. This kind of over-shipping is extremely wasteful of environmental resources, namely, fuel.

What is needed, therefore, is a way to prevent over shipping in user-to-user transactions.

BRIEF DESCRIPTION OF THE INVENTION

Disclosed is a shipping system, method and device that allows a sender to address a letter or package with nothing but an e-mail address, phone number, or license plate number so that knowledge of a physical address on the part of the sender is not necessary for sending an item.

The disclosed shipping system includes additional novel features, such as: a method for integrating shipping details into the process of paying for an item in a user-to-user transaction; a smart dropbox that provides proof of mailing; and an improved fulfillment system that allows one seller who is closer to the buyer in an e-commerce transaction to fulfill the duty of another seller so that shipping distance is minimized.

DETAILED DESCRIPTION OF THE INVENTION WITH REFERENCE TO THE DRAWINGS

Definitions of Terms Used Herein:

"Primary addressee" signifies a person or entity that is the person or entity to whom a letter or package is being sent according to the present invention. When a letter or package has been delivered to the primary addressee, it has reached its final destination.

"Primary address" signifies a reference that is provided by the sender of a letter or package, which reference is then used by a service to locate a physical address to which the letter or package will be initially delivered. A primary address is not a physical address, i.e., not a street address or P.O. Box. In the preferred embodiment of the present invention, a sender should use an e-mail address, a phone number, or a license plate number as the primary address.

"Secondary addressee" signifies a person or entity to whom a letter or package is initially delivered by a service (national postal service, private courier, etc.) according to the present invention. In some cases, the secondary addressee will be the same person or entity as the primary addressee; in other cases, the secondary addressee will simply be an intermediary.

"Secondary address" signifies a physical address that is obtained by way of looking up a primary address in a database according to the present invention.

Figure 1A:
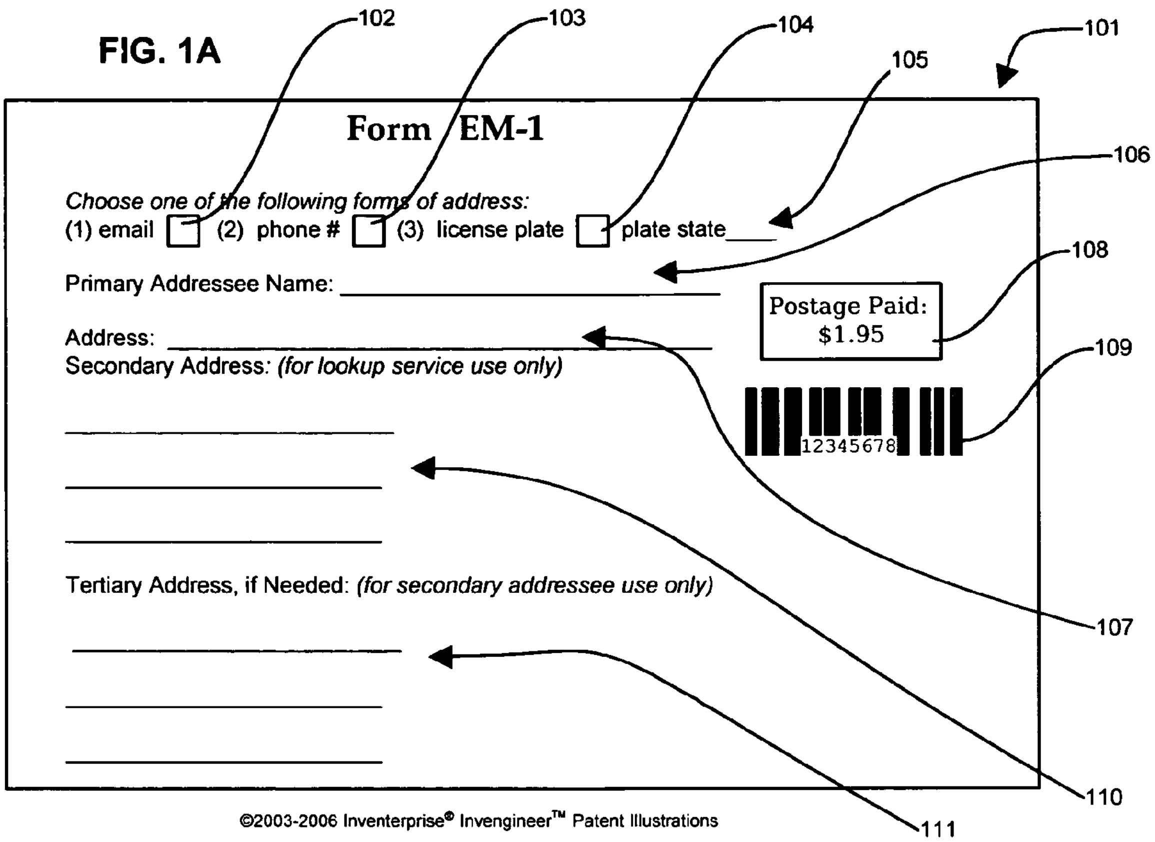
FIG. 1A is an anterior view of a disclosed shipping label.

Discussion:

Disclosed in FIG. 1A is an article of manufacture that is a shipping label 101. The label 101 is made of paper or plastic, upon which has been printed a form, and includes an adhesive backing (not shown) that allows the label to be affixed to a letter or package. This label 101 includes a check box 102 through which a user can indicate that an e-mail address is being used, a check box 103 through which a user can alternately indicate that a phone number is being used, and a check box 104 through which a user can alternately indicate that a license plate is being used. A space 105 is also provided for indicating the issuing state associated with a license plate if a license plate is used as the primary address for a given article.

The label 101 also includes a space 106 for identifying a primary addressee and a space 107 for providing a primary address according to the present invention. An additional space 110 is provided for entry of a secondary address, and an additional space 111 is provided for entry of a tertiary address. Also printed on the face of the label 101 is a postage-paid indicator 108 and a machine-readable code 109 for use in scanning and tracking of a package in various steps of a disclosed process of the present invention.

Figure 1B:
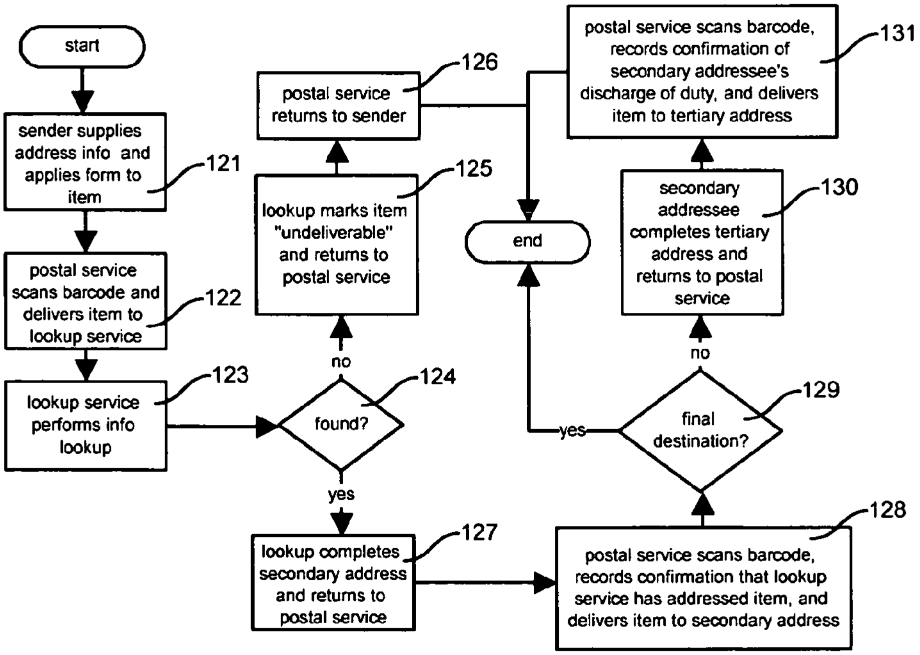
FIG. 1B is a flowchart disclosing steps of a disclosed shipping process.

The label 101 can be used in a shipping process disclosed in FIG. 1B. First, a sender completes 121 certain portions of the label 101. Specifically, the sender checks one and only one of the check boxes 102-104 to indicate whether the primary address being provided is an e-mail address, a phone number, or a license plate. The sender checks 121 the e-mail check box 102 to indicate that the primary address provided is an e-mail address. Alternately, the sender checks 121 the phone number check box 103 to indicate that the primary address provided is a phone number. Alternately, the sender checks 121 the license plate check box 104 to indicate that the primary address provided is a license plate. In and only in the latter case, the sender completes the plate state space 105 by inserting a state name or abbreviation in the plate state space 105.

The sender also provides 121 a primary address by writing, typing, printing, stamping or otherwise supplying it in the primary address space 107. The sender should also provide a name of the primary addressee to whom the letter or package is being sent by inserting the name in the primary addressee name space 106. However, many letters and packages can be delivered properly under the present invention even if this space 106 is left blank.

Figure 2:
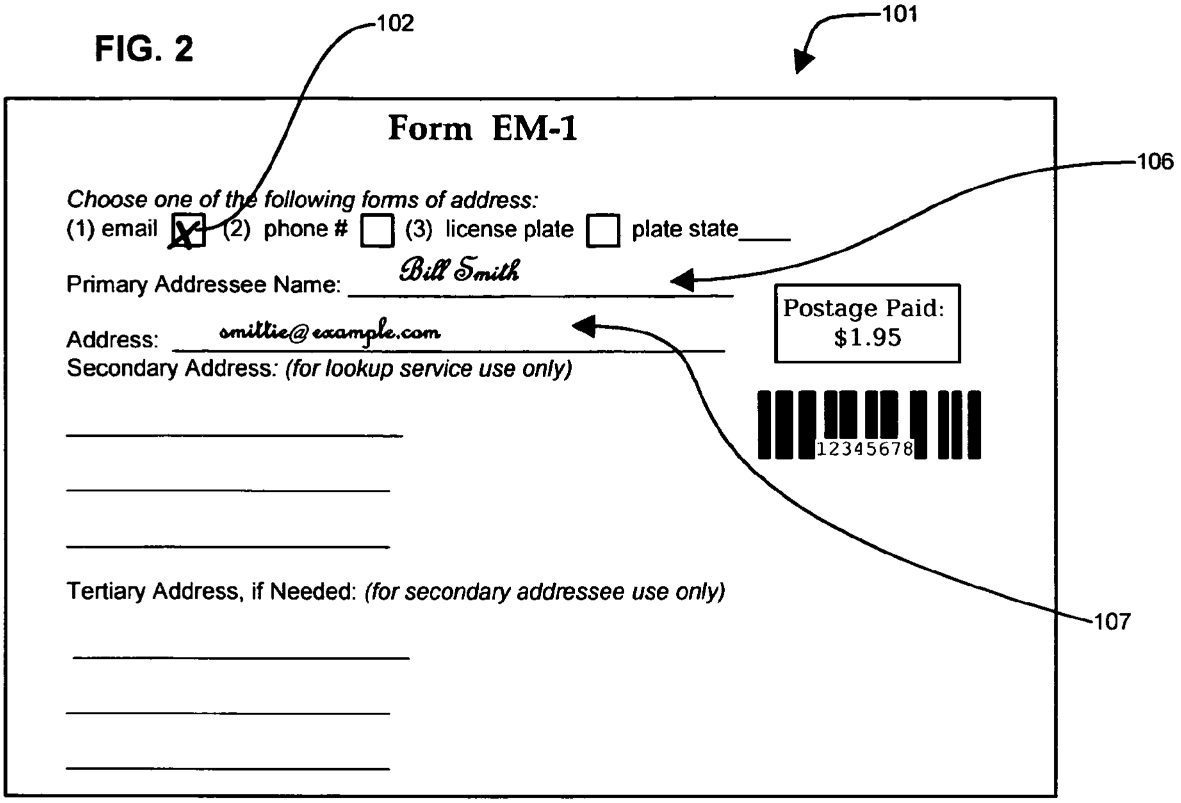
FIGS. 2 through 4 depict the shipping label disclosed in FIG. 1A at different stages of the process shown in FIG. 1B.

Once the sender has completed the label 101 as described above, the label appears similar to the example depicted in FIG. 2, in which the label 101 has been completed by checking the e-mail box 102, writing an intended recipient's name in the primary addressee name space 106, and writing the intended recipient's e-mail address in the primary address space 107.

Thereafter, the sender affixes 121 the label 101 to the item being sent and deposits the item with a postal mail service, such as the USPS (United States Postal Service), so as to mail the item just as though it were a conventionally addressed letter or package.

The postal mail service scans the unique barcode 109 on the label 101, storing in its database a record that the article has been mailed, and then, recognizing that the article has no physical mailing address, hands off 122 the item to a second service ("lookup service"). The lookup service then looks up 123 the primary address in an appropriate database according to a process disclosed in FIG. 7. If a physical address is found 124 to be associated with the primary address, the lookup service inserts 127 the physical address in the secondary address space 110 and returns 127 the item to the postal mail service.

Figure 3:
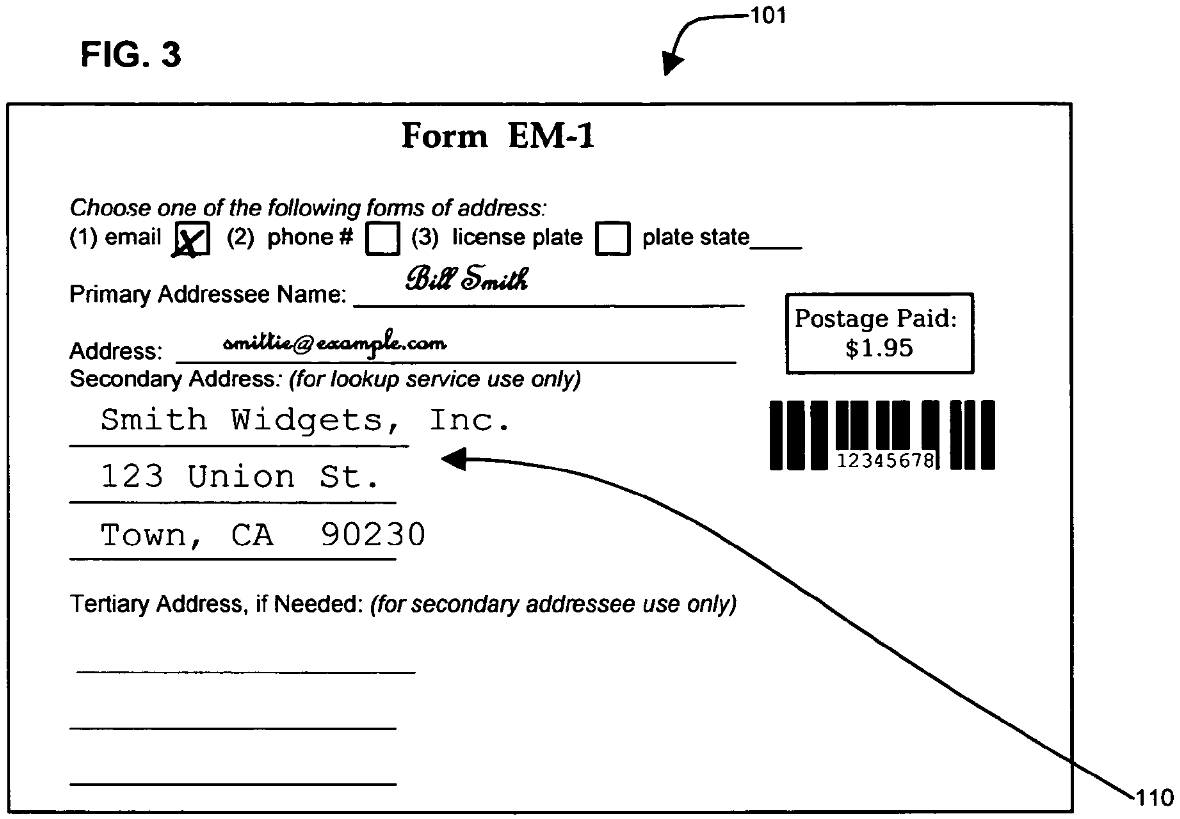

Once the lookup service has completed the label 101 as described above, the label appears similar to the example depicted in FIG. 3, in which the label 101 has been further completed by printing a physical address in the secondary address space 110.

Upon regaining possession of the item, the postal service again scans 128 the item, stores 128 a database record memorializing the event, and delivers 128 the item to the physical address that appears as the secondary address on the label 101.

In many cases, the article will have reached its final destination 129 upon delivery to the secondary address. If so, the process ends there. However, oftentimes the secondary addressee is not the primary addressee. For instance, a particular domain name may be owned by one company, but that company may provide e-mail addresses to thousands of individuals. In such a case, delivering to the secondary addressee—the domain name registrant—will not effectively deliver the item to the intended recipient, e.g., the user of a particular e-mail address.

Figure 4:
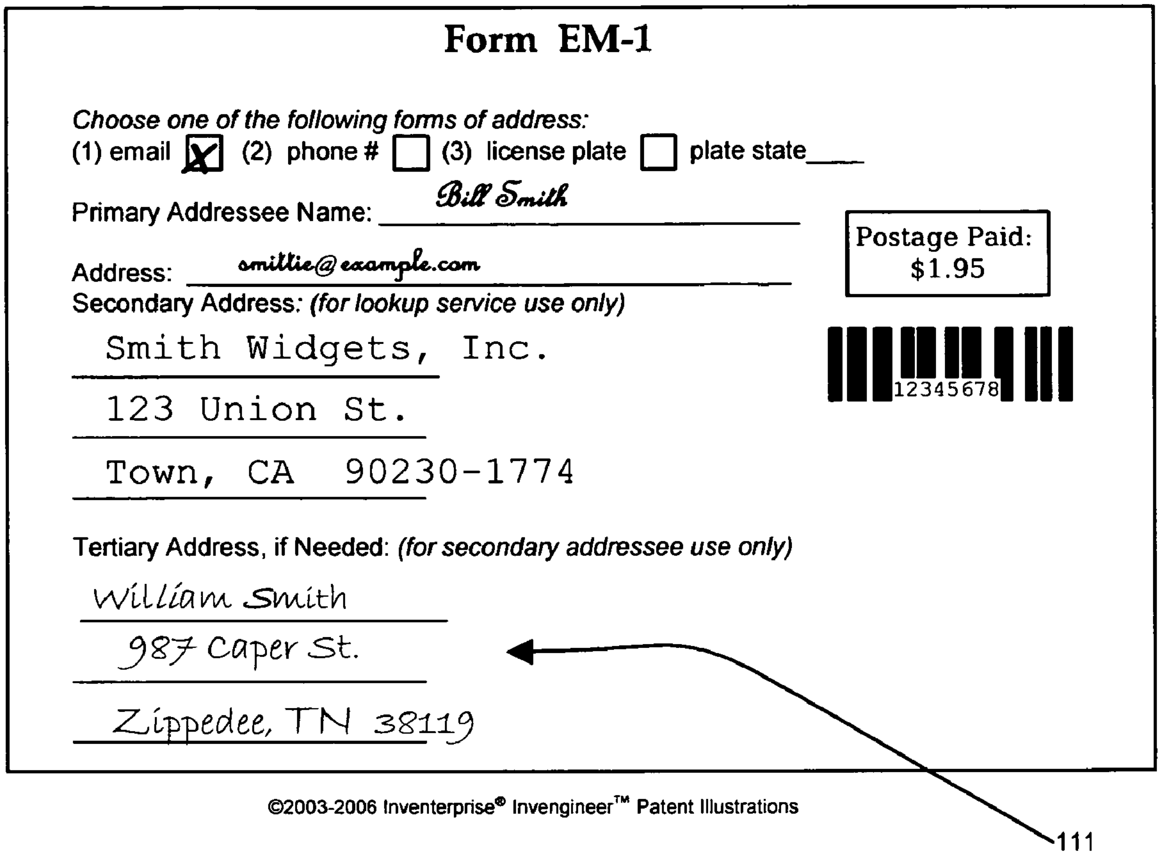

If the secondary addressee is not the intended recipient of the item, the process continues. In this case, the secondary addressee, which is typically a company when not the primary addressee, receives the item from the postal service and then looks up the primary address in its own internal databases, such as an employee database, so as to locate a physical address associated with the primary address or primary addressee. This physical address is then added 130 to the label 101 in the tertiary address space 111 as demonstrated in the example in FIG. 4. The item is then returned 130 to the postal service. The postal service then scans 131 the barcode once again, stores 131 a record of its receipt of the item from the secondary addressee, and then delivers 131 the item to the physical address indicated in the tertiary address space 111. At this point, the item is (provided second addressee's records are correct) in the hands of the intended recipient, and the process ends.

To illustrate the process depicted in FIG. 1A by example: a hypothetical sender who wishes to send a package to a hypothetical intended recipient named Bill Smith enters the name "Bill Smith" in the primary addressee name space 106 as depicted in FIG. 2, checks the e-mail check box 102, and writes Bill Smith's e-mail address ("smittie@example.com") in the primary address space 107. This label 101 is then applied to a package which is then mailed as regular mail. The post office scans the label and gives the whole package to a lookup business. The lookup business researches the domain name registration record for the domain name "example-.com" and transcribes the name ("Smith Widgets, Inc.") and address ("123 Union St., Town, CA 90230-1774") of the domain name registrant into the secondary address space 110 as depicted in FIG. 3. The lookup business then gives the package back to the postal service, which again scans the label and then delivers the whole package to the secondary addressee, namely, Smith Widgets, Inc. But Bill Smith retired long ago from Smith Widgets, Inc., and does not receive mail at the company address. His company knows that fact, and a clerk at the company then fills in the tertiary address space 111 with a physical address that the company knows to be the correct home mailing address for Bill Smith ("987 Caper St., Zippedee, Tenn. 38119") as demonstrated in FIG. 4. The package is then once again handed back to the postal service, which then delivers the package to Bill Smith at his home in Tennessee. Mr. Smith is happy (not shown).

Figure 5:
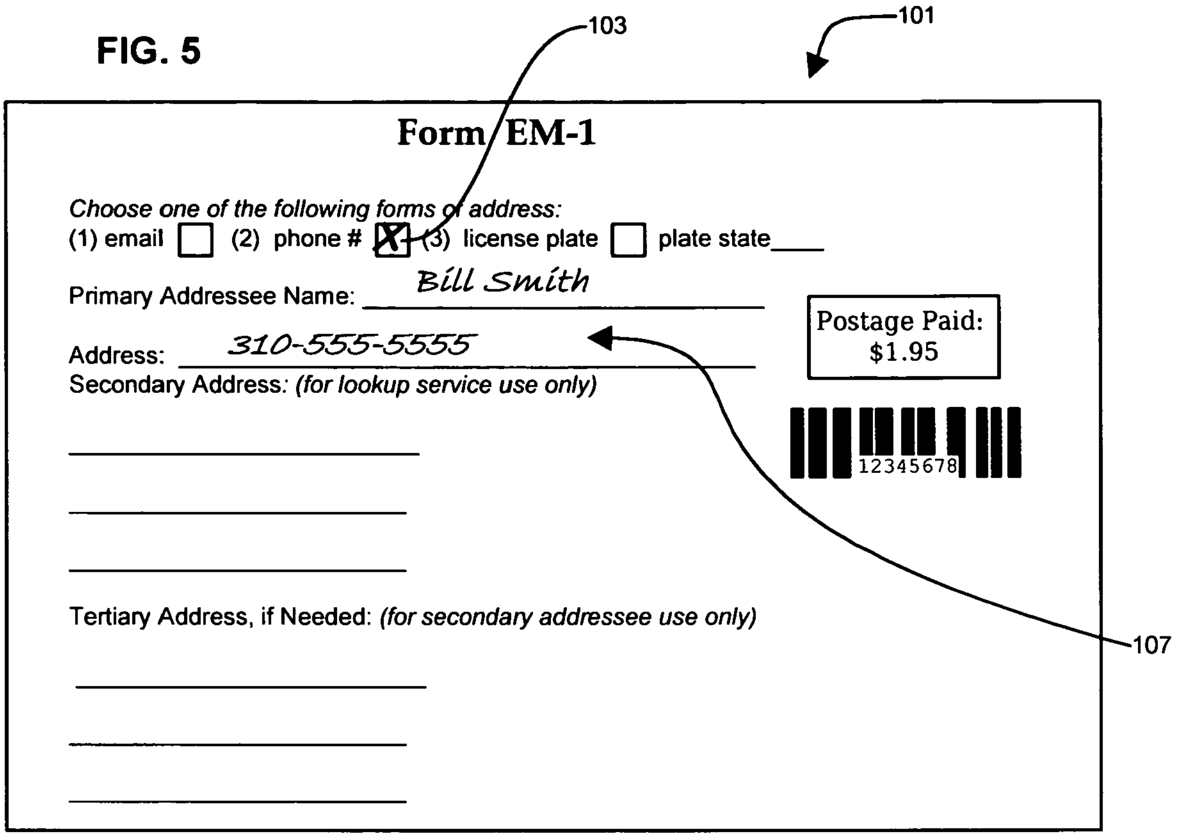
FIGS. 5 and 6 are anterior views of additional disclosed shipping labels for use with the present invention.
Figure 6:
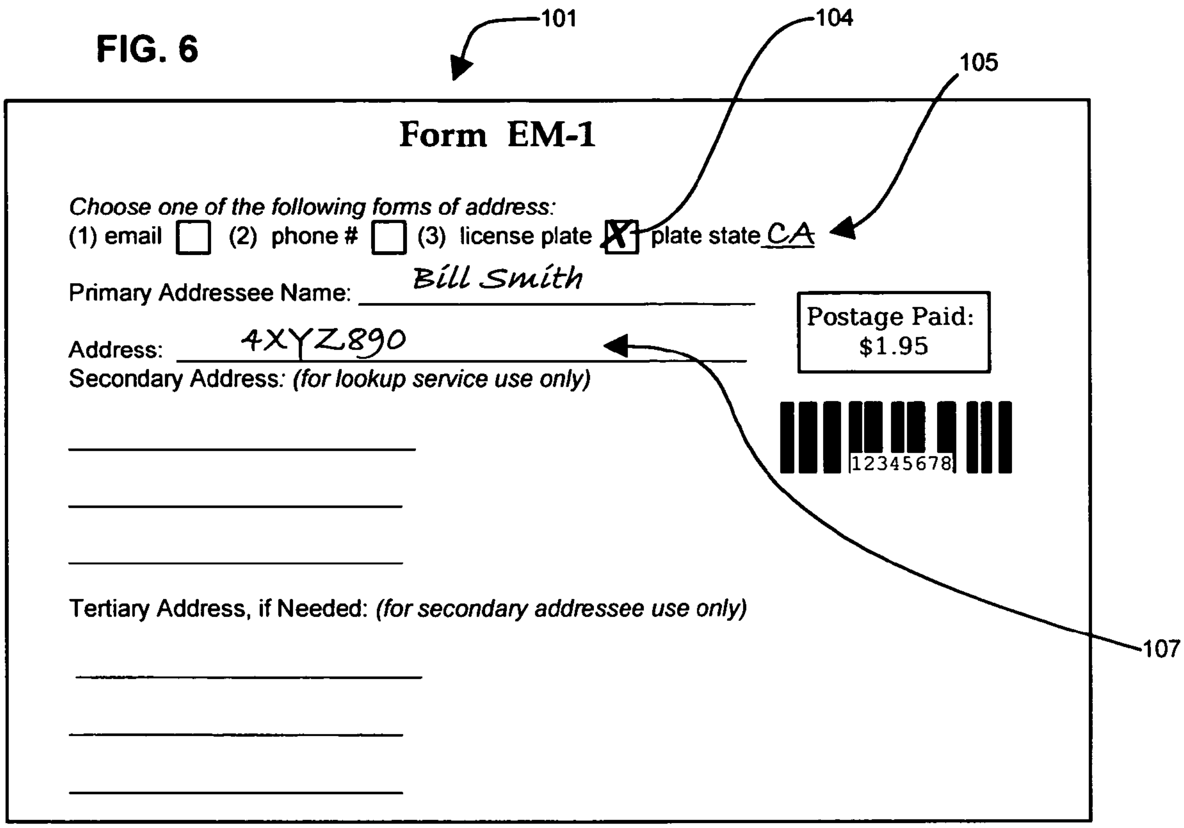

If the sender had wished to use the intended recipient's phone number instead of e-mail address, the sender would have filled out the label 101 as illustrated in FIG. 5. If the sender had wished to use the intended recipient's license plate number or alphanumeric character string appearing on a license plate, the sender would have filled out the label 101 as illustrated in FIG. 6.

Figure 7:
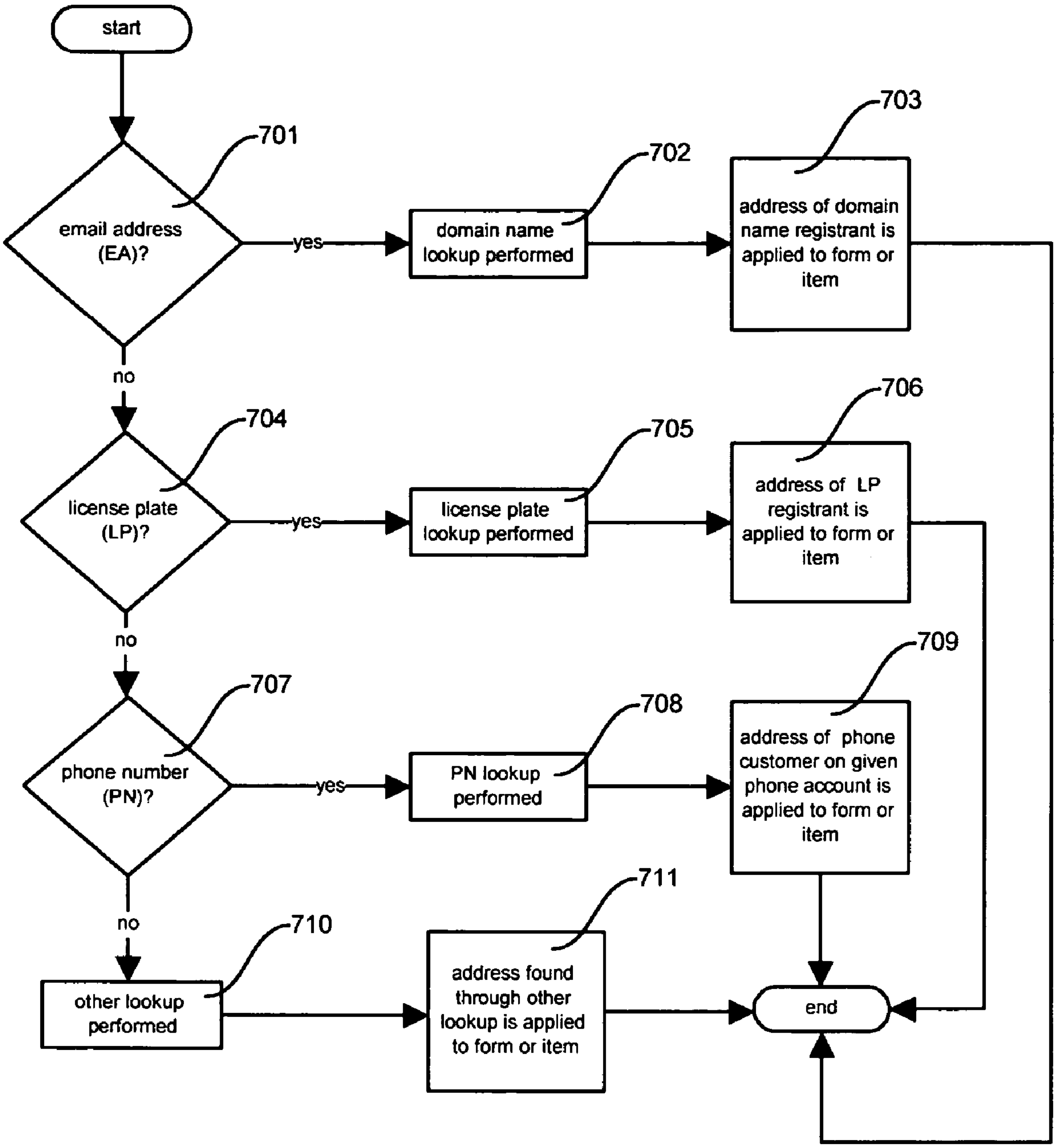
FIG. 7 is a flowchart disclosing steps of a disclosed process whereby a physical address is found and used according to the present invention.

In FIG. 7, steps of a process for translating a primary address into a secondary address are disclosed. If the primary address provided by a sender is an e-mail address 701, the lookup service looks up 702 the domain name ("example-.com") contained in the e-mail address in an appropriate database, such as a database maintained by ICANN or Network Solutions (the "WhoIs" database), or similar database maintained by one or more domain name registrars. This lookup can be automated or manually conducted. The address of the registered owner (the "registrant") of the domain name as this address appears in the domain name registration record is then used 703 as the secondary address on the label 101.

If the primary address provided by a sender is a license plate number 704, the lookup service looks up 705 the license plate number in a database maintained by the state indicated by the sender in the plate state space 105, (such as the California Department of Motor Vehicles if "California" is entered into the plate state space 105), or a similar database maintained by another entity. The address of the registered owner of the vehicle license plate as it appears in the registration record is then added 706 as the secondary address 107 to the label 101 by the lookup service.

If the primary address provided by a sender is a phone number 707, the lookup service looks up 708 the phone number in a database maintained by whichever telephone company is the carrier for that phone number or a similar database maintained by another entity. The billing address as it appears in the record associated with the given telephone number is then added 709 to the label 101 in the secondary address space 107 by the lookup service.

It is possible that the present invention can be used with other forms of primary address. If so, another form of lookup is performed 710 and an address found through this other form of lookup is supplied 711 in the secondary address space 107 by the lookup service.

Figure 8:
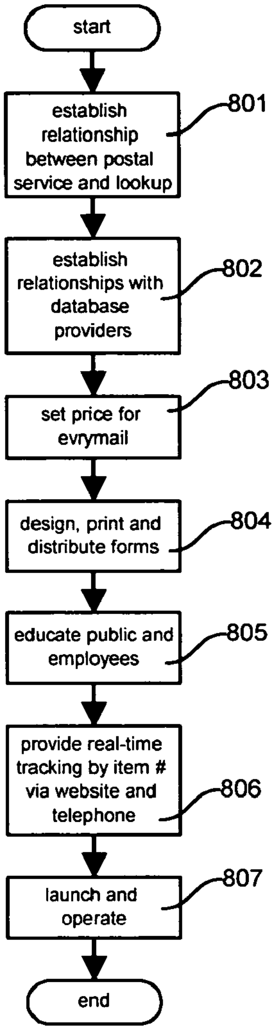
FIG. 8 is a flowchart disclosing steps of a disclosed process whereby one or more entities can launch a service according to the present invention.

Successful deployment of the present invention calls for cooperation between multiple entities. A process for such deployment is disclosed in FIG. 8. First, relationships are established 801 between a postal service and a lookup service provider. Initially, the lookup service provider is likely to be a private entity, but certainly this service provider can also be simply an internal department operated by the postal service. In establishing this relationship, the primary focus should be on efficient handling of the handoffs made between the postal service and the lookup service. These handoffs can either be physical or simply informational: for instance, the postal service can physically deliver items addressed according to the present invention to the lookup service, which can then physically redeliver the items to the postal service after secondary addresses have been added. Alternately, the postal service can maintain physical possession of the items and simply convey primary address information to the lookup service, which then electronically conveys secondary address information to the postal service to be used accordingly.

While most of the information required by the present invention is publicly available, ideally the lookup service should establish 802 relationships with all entities that maintain databases that are used in the present invention (domain name registration database, license plate registration database, telephone number database, etc.) so as to maximize the efficiency of the lookup process. Automated lookup of secondary addresses can be greatly facilitated through coordination of the information technology of the lookup service and that of the database provider.

Pricing for use of the present invention must then be set 803. Factors to be considered in setting the price include: the revenue model chosen (see, e.g., FIGS. 9A through 9D); average time required to lookup a secondary address per item; rate of failure to find a secondary address; time and costs associated with having multiple deliveries and handoffs for each item; expense of raising awareness of the availability and functionality of the invention; printing costs; and other considerations.

Labels must be then designed, printed and distributed 804. The population at large, i.e., the senders of letters and packages who would take advantage of the present invention, must be made aware that the service is available and taught how to use it 805; employees of the postal service must also be so informed 805.

Scanning and tracking of items shipped through the present invention must be incorporated 806 into existing item-tracking technology used by the postal service (e.g., as used for conventional "Express Mail") so that senders and recipients can track the progress of packages by web site or telephone inquiry. The service is then launched and operated 807.

Various revenue models are disclosed. One approach, depicted in FIG. 9A, is to simply treat the label 101 as a large postage stamp, such that senders are charged 901 for the form, and postage is paid by applying the label to the item being sent.

Figure 9D:
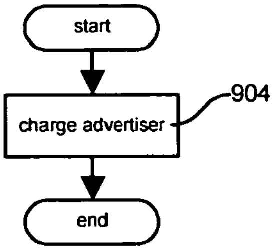
FIGS. 9A through 9D are flowchart disclosing steps of disclosed revenue models for use with the present invention.
Figure 9A:
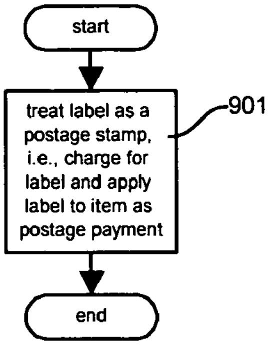
Figure 9B:
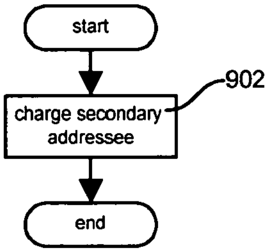

Another approach, depicted in FIG. 9B, is to charge 902 the secondary addressee. This approach may be very attractive to corporations that are interested in the concept of having all mail to anyone in their organization being deliverable with just the address "anyone@example.com" and coming in through a single physical location. The corporation can be charged a flat periodic rate or a per-item fee. The postal service may also be interested in incentivizing corporations to take this approach, since it results in the postal service delivering all mail to the same address (that associated with the domain name) and the bulk of the burden of sorting this mail being shifted onto the corporation. It may also be a compelling way for providers of e-mail accounts (e.g., AOL, Yahoo, Gmail) to add value to their e-mail services and increase customer loyalty to and reliance on these services.

Figure 9C:
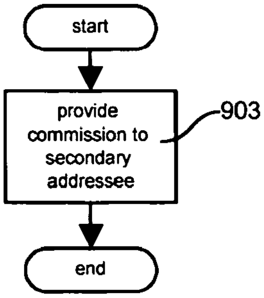
Figure 10:
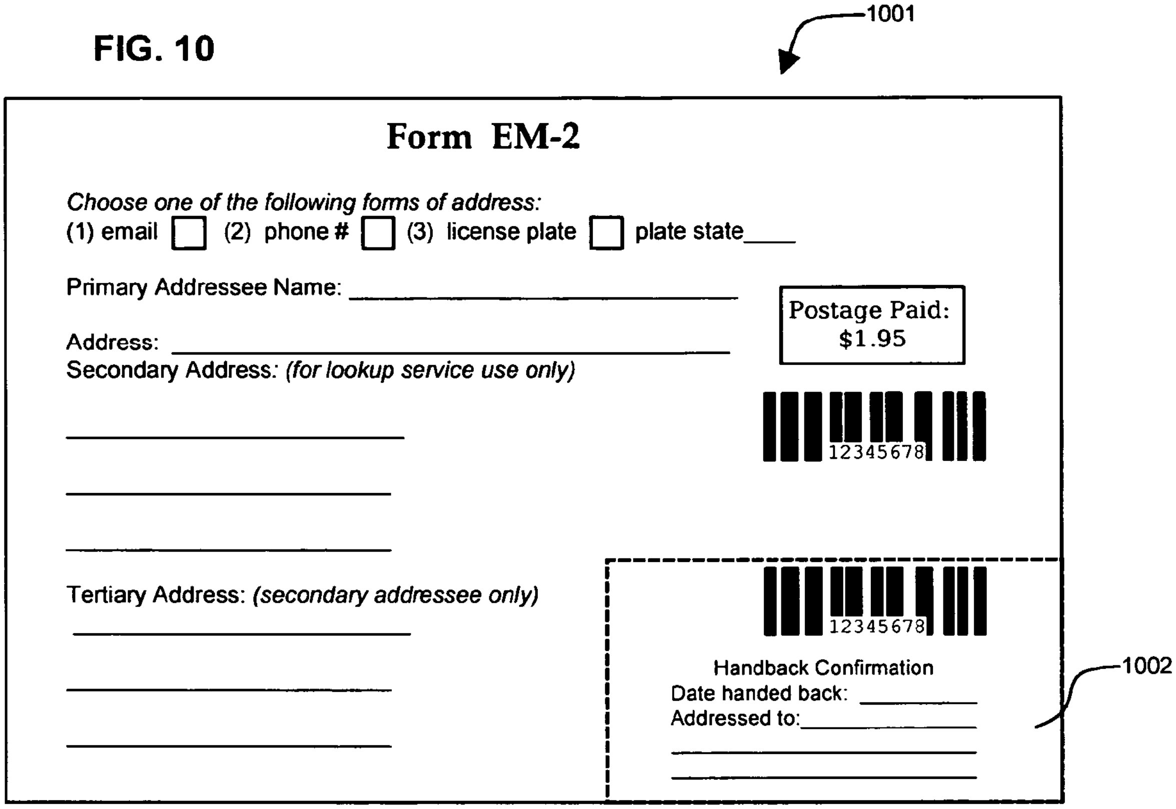
FIGS. 10 and 11 are anterior views of additional disclosed shipping labels for use in the present invention.

Another approach, depicted in FIG. 9C, is to provide 903 a commission to the secondary addressee whenever a secondary addressee is required to provide a tertiary address. This commission rewards the secondary addressee for participating in the process and helping deliver the item. This commission is payable by the postal service out of funds charged under one of the other depicted steps. This commission may require presentation of a tear-off certificate 1002 in FIG. 10 that the secondary addressee, having dutifully provided a tertiary address, tears off and retains when handing back the item to the postal service.

Figure 11:
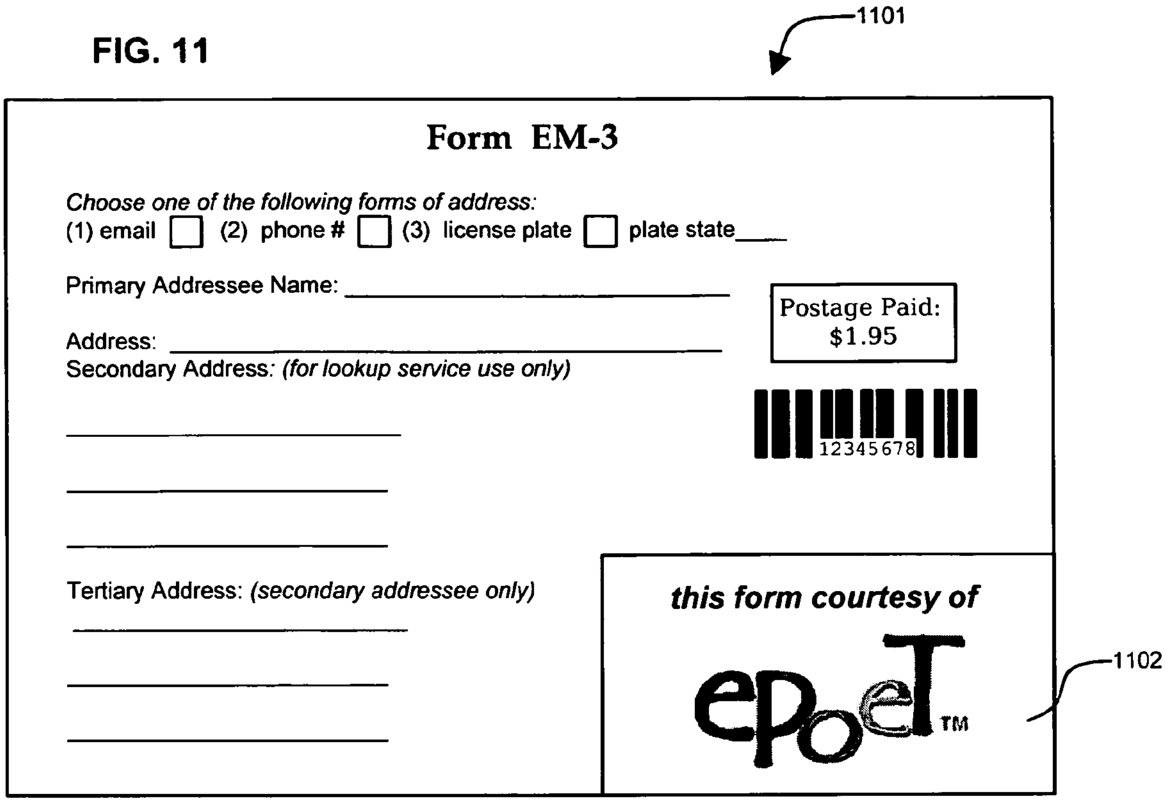

Another approach, depicted in FIG. 9D, is to charge 904 a third-party, such as an advertiser, for a portion or all of the postage price. The advertiser may thereby purchase an advertisement on the face of the form such as the advertisement 1102 depicted in the example appearing in FIG. 11.

Figure 12:
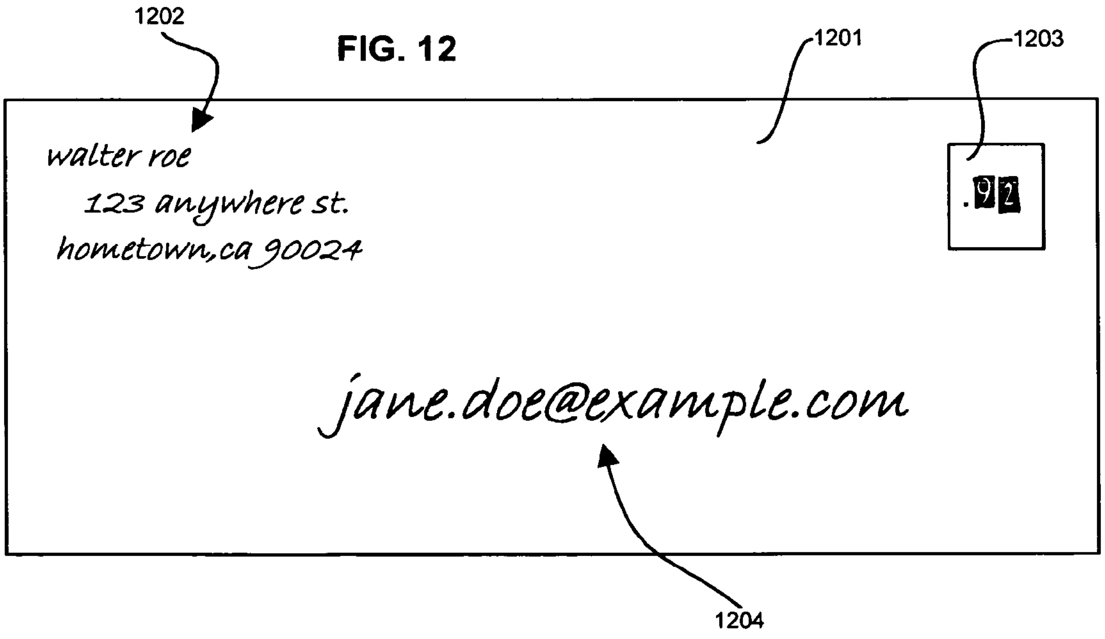
FIG. 12 is an anterior view of a disclosed envelope according to the present invention.
Figure 13:
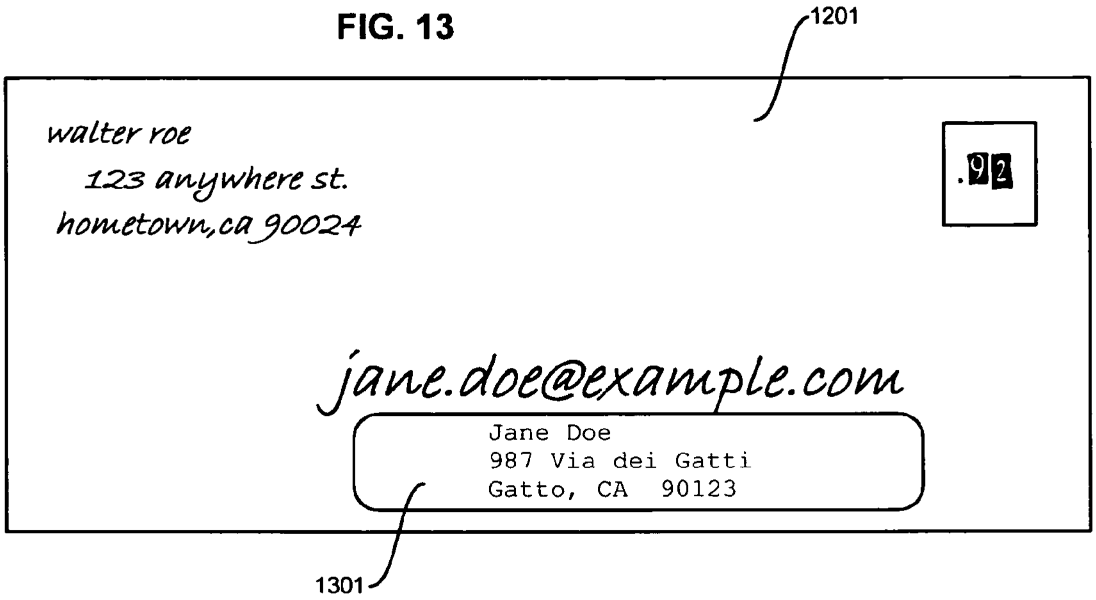
FIG. 13 is an anterior view of the envelope disclosed in FIG. 12 after it has been modified according to the present invention.

Once the general public has become aware of the present invention and how it works, use of a special label may not be necessary. In such a case, an envelope 1201 such as that depicted in FIG. 12 is all that is needed to send a letter. The sender affixes a stamp 1203 of sufficient value to the envelope 1201, puts his or her return address 1202 (which can be a physical address or otherwise) on the envelope, and puts a complete e-mail address 1204 for the person to whom the letter is being sent on the face of the envelope. Thereafter, a lookup is performed as described above, and a physical mailing address ascertained through the lookup is printed on a mailing label 1301 in FIG. 13 which is affixed to the envelope 1201.

The ability to mail a physical letter or package using nothing but an e-mail address is particularly valuable in the context of largely anonymous user-to-user e-commerce transactions, such as Internet auctions. Under the present invention, when the transaction is finalized 1401 (e.g., an Internet auction closes with a winning bidder), a payment processor processes the buyer's payment and deducts 1402 an amount from the proceeds before providing these proceeds to the seller. The deducted amount is then applied toward the purchase of postage for the item to be delivered by the seller to the buyer. The payment processor then provides 1403 a prepaid postage label in electronic form, including a unique barcode identifier, to the seller, either by e-mail or on the World Wide Web. The seller then prints 1404 the label and applies 1404 it to the package. The seller then deposits 1405 the package in a smart drop box, such as the smart drop box 1503 in FIG. 15. The package is then weighed by the smart drop box and the unique barcode on the label scanned 1406. If the package is heavier than expected 1407, the seller pays 1408 the additional postage due using the credit card reader 1507 of the smart drop box 1503. If the package is lighter than expected 1411, the difference between actual postage due and postage paid is refunded 1412 to the payment processor (ascertainable through the barcode identifier), who then passes the refund on to the seller 1413. In either case, provided that the package and label are otherwise acceptable, a certificate of mailing is printed for the seller 1409, and the postal service delivers the package 1410.

Figure 14:
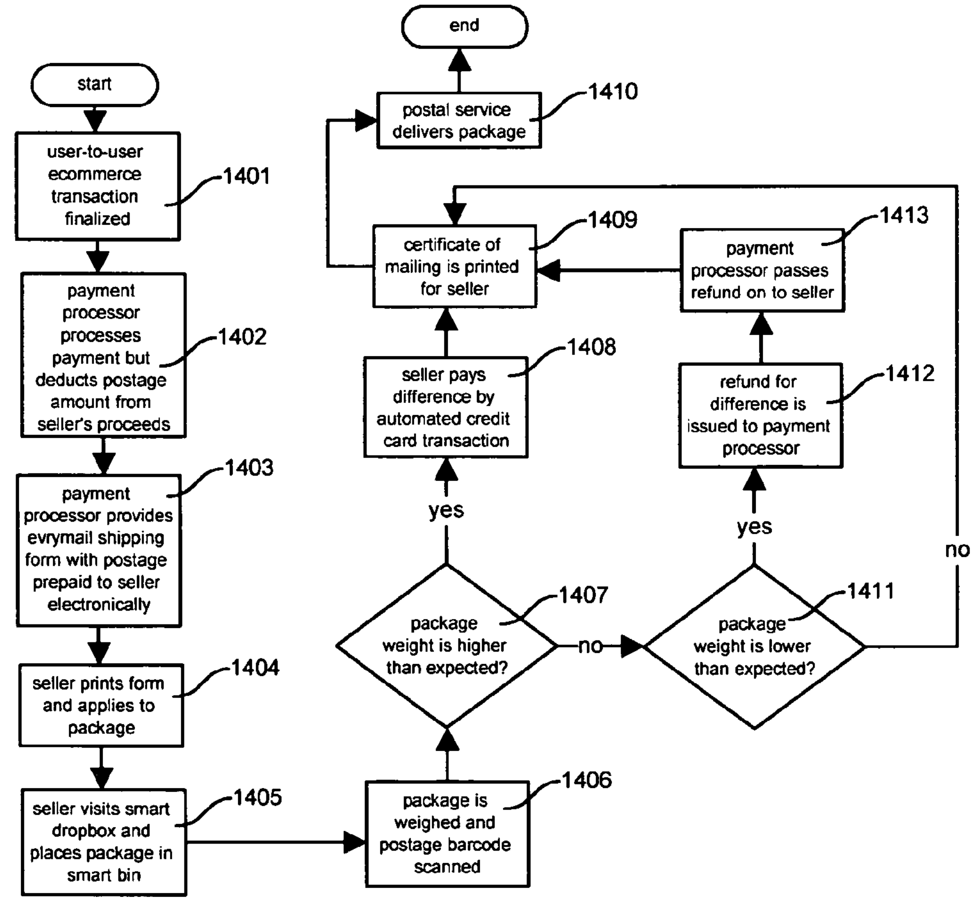
FIG. 14 is a flowchart disclosing steps of a disclosed process whereby shipping functions are incorporated into a process of paying for an item.
Figure 15:
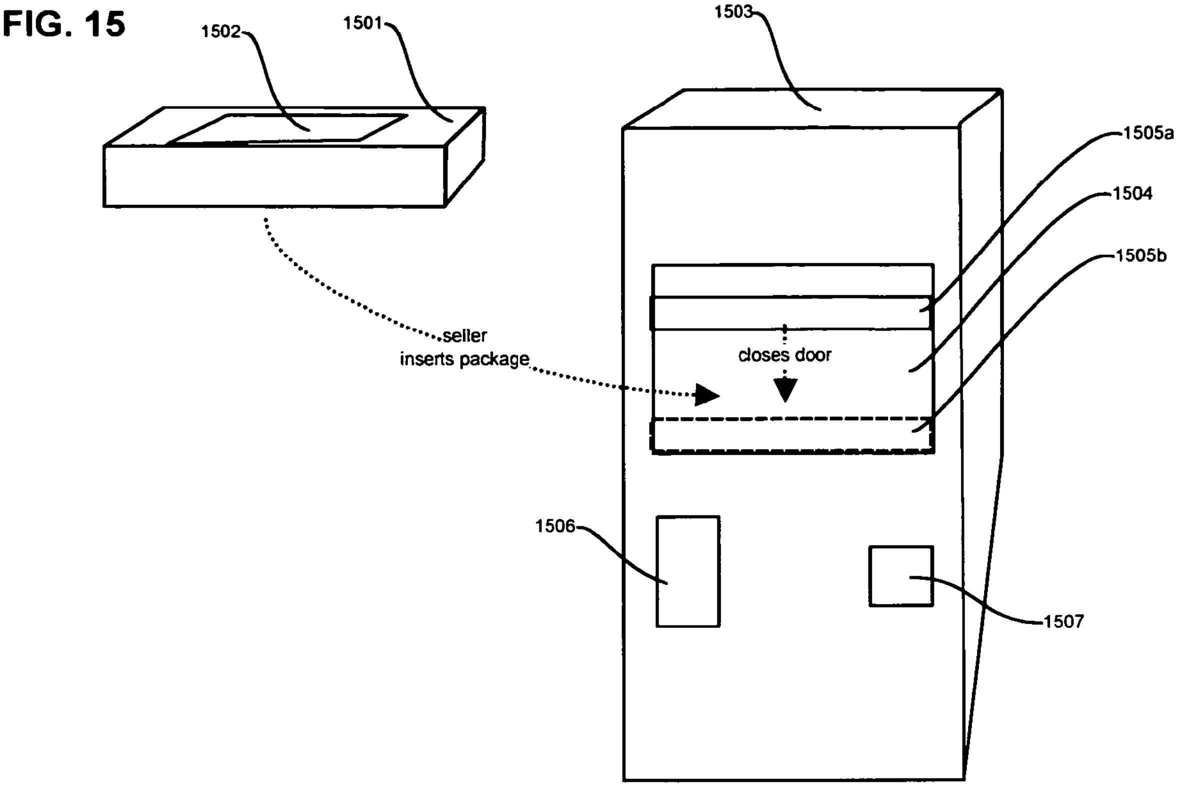
FIG. 15 is a perspective view of a disclosed smart dropbox according to the present invention.
Figure 16:
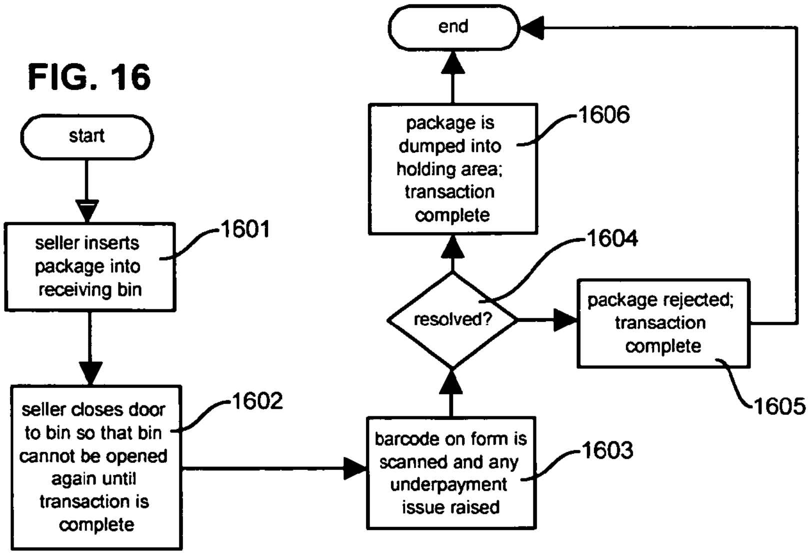
FIG. 16 is a flowchart disclosing steps of a disclosed process whereby the smart dropbox disclosed in FIG. 15 is used according to the present invention.

The function of the smart drop box 1503 is explored in greater detail in FIG. 16 with reference to FIG. 15. A seller inserts 1601 a package 1501 equipped with a mailing label 1502 in a receiving bin 1504. The seller then closes 1602 the door by moving it from open position 1505*a* to closed position 1505*b*. Once the door is closed, it automatically locks and cannot be reopened until the transaction is completed. The receiving bin 1504 is equipped with a scale (not depicted) so as to weigh 1603 the package 1501, and a scanner (not depicted) so as to scan the label 1502. If there are any problems that cannot be resolved with respect to the label (e.g., it's already been used), the package is rejected 1605, the door opens 1505*a* so that the sender can remove the package, and the transaction is complete. If postage is insufficient but this insufficiency is resolved 1604 per the process depicted in FIG. 14, the package is automatically dumped 1606 into a holding area and the transaction is complete, such that a certificate of mailing can be printed 1409 and the remainder of the process depicted in FIG. 14 and elsewhere continued. The door to the now-empty receiving bin opens again so that the next customer can use the smart drop box.

Figure 17:
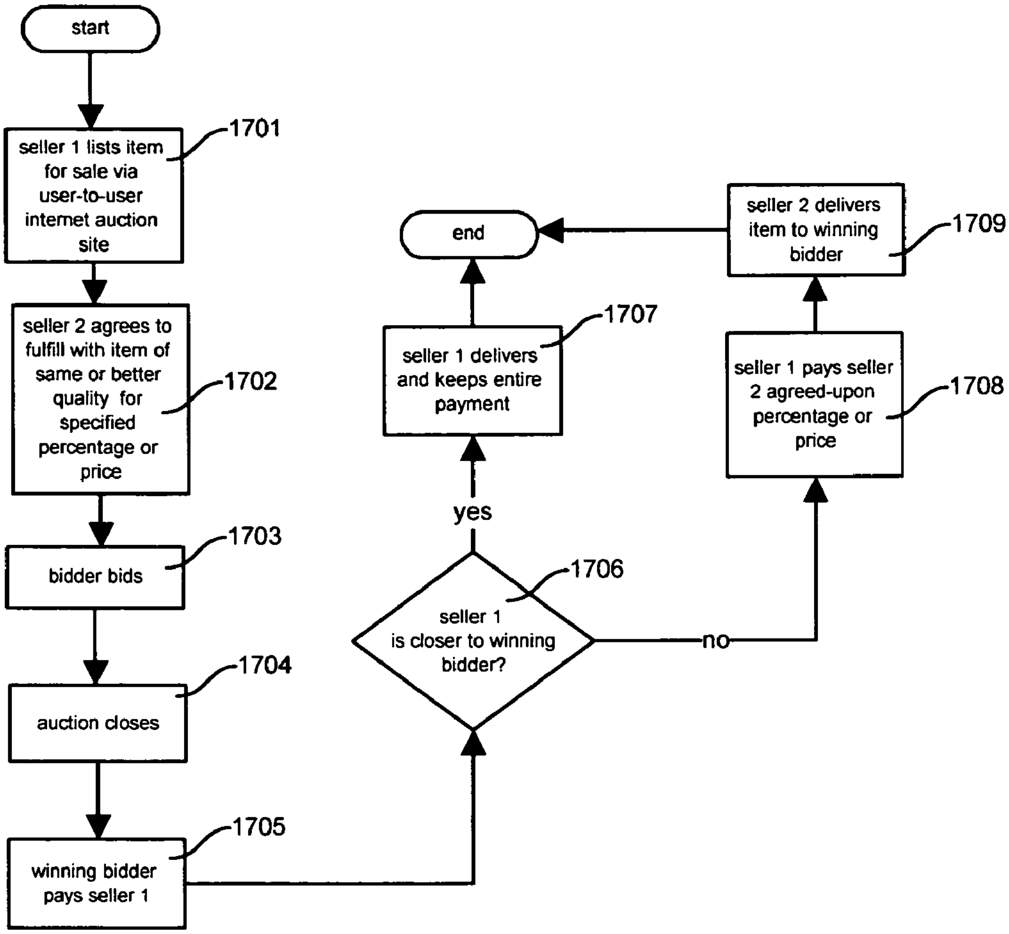
FIG. 17 is a flowchart disclosing steps of a disclosed process whereby shipping distance is minimized in that one e-commerce seller fulfills the contractual duty of another e-commerce seller according to the present invention.

So as to further maximize efficiency, a fulfillment system disclosed in FIG. 17 can be used in conjunction with the shipping system disclosed herein. A first user ("seller 1"), through a Web submission form, lists an Internet auction for a non-unique item 1701 on an Internet auction World Wide Web site. A second user ("seller 2"), using a Web submission form also provided by the provider of the auction site, indicates his or her willingness to participate in a "fulfillment queue" for this listing, agreeing to a specified price for the item or to a percentage of the closing value of the auction. (Seller 1 can set maximum prices and percentages he or she is willing to pay for fulfillment, which maximums are visible to seller 2 prior to his or her commitment to be in the fulfillment queue.)

Thereafter, a bidder bids 1703, the auction closes 1704, and the winning bidder pays 1705 seller 1. If seller 1 is closer 1706 to the winning bidder geographically, seller 1 delivers 1707 the item directly to the winning bidder, keeping the entire payment for the item. But if seller 2 is closer geographically to the winning bidder, seller 1 pays 1708 seller 2 according to the terms agreed upon, and seller 2 delivers 1709 the item to the winning bidder. Seller 1 retains his or her item and can list it again for sale. An experience rating ("user feedback system") can be instituted so that sellers who join a fulfillment queue but fail to fulfill when called upon are blacklisted. If seller 2 fails to fulfill but another seller, seller 3, has joined the fulfillment queue, and is next in line in the queue, and is closer geographically to the purchaser than is seller 1, seller 3 delivers the item and is paid by seller 1.

Figure 18:
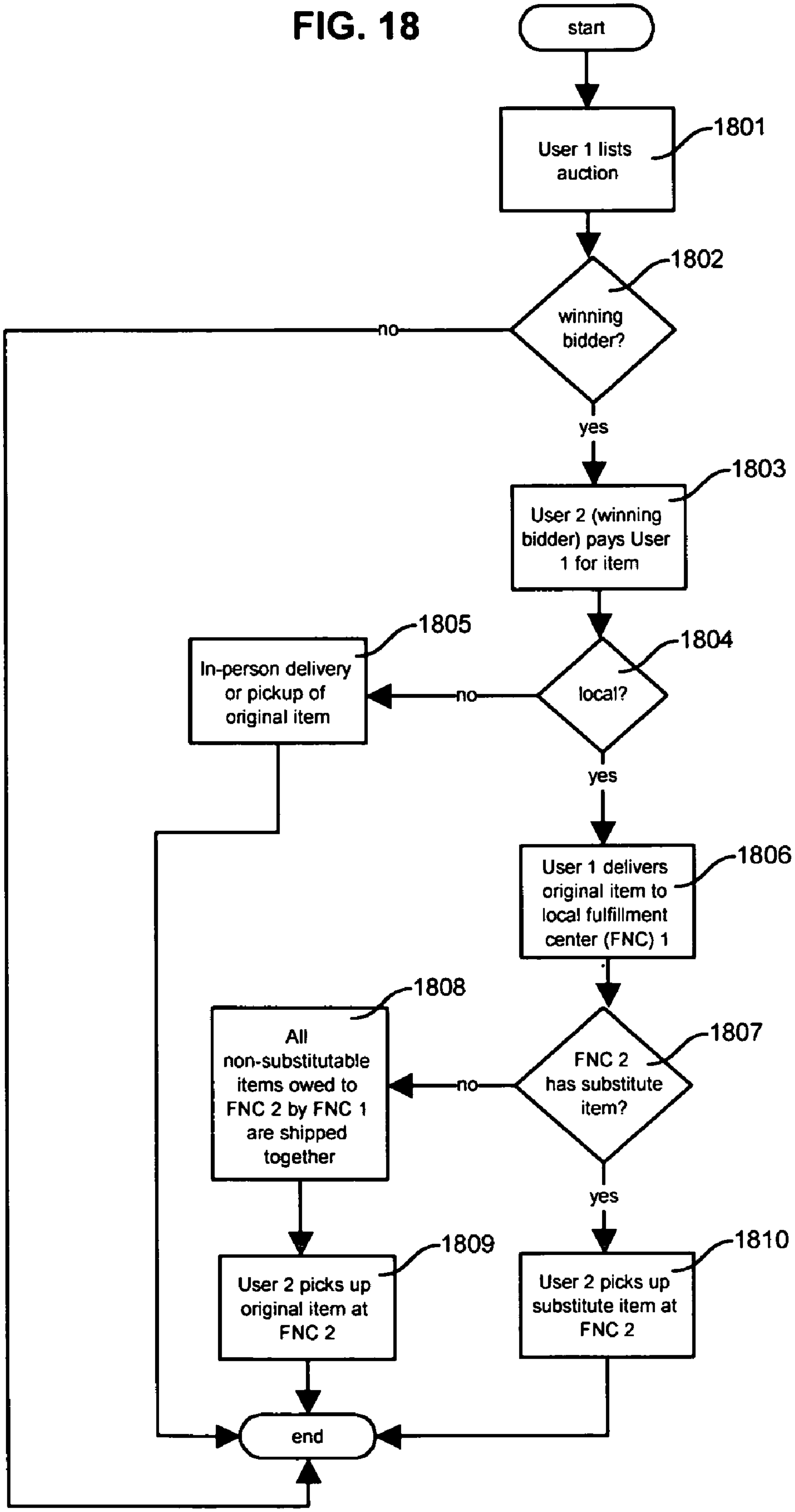
FIG. 18 is a flowchart disclosing steps of a disclosed process whereby shipping distance is minimized in that substitute goods purchased through an Internet transaction are procured through a local fulfillment network center according to the present invention.

An alternative embodiment fulfillment system is disclosed in FIG. 18: a seller lists an auction 1801, and if the auction closes with a winning bidder 1802, the winning bidder pays the seller 1803. If the two parties are local to each other 1804, the winning bidder picks up 1805 the item directly from the seller or the seller delivers the item directly to the winning bidder per the above shipping processes. Otherwise, the seller delivers 1806 the item to a first fulfillment network center ("FNC #1"), which is one of many fulfillment network centers around the country. A second FNC ("FNC #2") exists in the city of the winning bidder. If FNC #2 has 1807 in its possession a fungible item in the same condition as that purchased by the winning bidder, the winning bidder picks up 1810 the substitute item from FNC #2, and FNC #1 simply retains the original item delivered by the seller. If FNC #2 does not have a viable substitute item, the original item—along with all other items necessary for "settlement" between FNC #1 and FNC #2—are shipped 1808 from FNC #1 to FNC #2. The winning bidder then picks up 1809 the original item FNC #2. Instead of dropping off and picking up items from an FNC, items can be shipped to and from the local FNC using the above shipping processes, thereby minimizing shipping distances so as to avoid the over-shipping problem described above.

Summary

The disclosed shipping method can thus be summarized as being a method of shipping a letter or package, said method comprising the following steps:

applying a primary address to an item, said primary address being selected from the group consisting of (I) an e-mail address, (II) an alphanumeric character string appearing on a license plate, and (III) a telephone number;

providing said item to a first service provider;

performing a lookup of said primary address in a first database, said first database being selected from the group consisting of (I) a database of domain name registrations, (II) a database of license plate registrations, and (III) a database of telephone number records; and delivering said letter or package to a secondary address, said secondary address being ascertained through the use of said first database.

In a preferred embodiment, said item is a shipping label, said shipping label comprising an encoded identifier for said item or the present transaction, and a postage-paid indicator; and said step of delivering said letter or package is performed by a second service provider, said second service provider being a national or publicly funded postal service.

The invention may additionally comprise the step of supplying a tertiary address, said tertiary address being supplied by a secondary addressee and being applied to said shipping label, and the step of delivering said letter or package to a tertiary addressee at said tertiary address.

The invention may additionally comprise the step of charging said secondary addressee for a portion of a delivery fee or paying a commission to said secondary addressee.

The disclosed fulfillment method can thus be described as being a method of conducting an electronic commerce transaction, said method comprising the following steps:

providing an Internet-accessible electronic commerce venue;

listing an item for sale via said venue, said listing being performed by a first seller;

specifying a percentage or price;

committing to provide a conditional fulfillment service to said first seller for said listing, said committing being performed by a second seller;

purchasing said item;

delivering said item or its equivalent to a purchaser, wherein said delivering is performed either by said first seller or by said second seller according to the geographical location of said purchaser; and paying said second seller said percentage or said price only when said delivering is performed by said second seller.

An alternative embodiment of the disclosed fulfillment method can thus be described as being a method of conducting an electronic commerce transaction, said method comprising the following steps:

providing an Internet-accessible electronic commerce venue;

listing an item for sale via said venue, said listing being performed by a first seller;

purchasing said item; and delivering said item or a fungible equivalent of said item, wherein said delivering is performed either by said first seller or by a local fulfillment center according to (I) the geographical location of said purchaser and according to (II) whether said local fulfillment center has a fungible equivalent of said item.

The disclosed shipping label can be described as a shipping label comprising:

an indicator of a primary address type, said primary address type being selected from the group consisting of an e-mail address, an alphanumeric character string appearing on a license plate, and a telephone number;

an indicator of a primary address; and an indicator of a secondary address. Said label may also comprise an indicator of a tertiary address, an advertisement, a barcode, a removable confirmation document, or a postage indicator.

The disclosed smart dropbox shipping method can thus be described as being a method of shipping a letter or package, said method comprising the following steps:

placing an item into a receptacle;

preventing removal of said item from said receptacle until a completion event has occurred;

scanning a code on said item;

weighing said item; and verifying that sufficient postage has been paid for delivery of said item. Said method may also comprise one or more of the following steps: paying for postage due for delivery of said item; automatically moving said item from said receptacle to a storage area; performing said completion event, said completion event being selected from the group consisting of (I) rejecting said item and (II) automatically removing said item from said receptacle and (III) printing a certificate of mailing; and refunding a portion of an amount paid according to said weighing of said item.

Although the description above contains many specificities, these should not be construed as limiting the scope of the invention but as merely providing illustrations of some of the presently preferred embodiments of this invention. Accordingly, the scope of the invention should be determined by the appended claims and their legal equivalents, rather than by the examples given. For instance, as is plain to one skilled in the art, it will be understood that features of one embodiment may be combined with features of other embodiments while other features may be omitted or replaced as being nonessential to the practice of the invention, regardless of whether such combination, omission or modification has been explicitly described.

Licensing information may be obtained through http://www.inventerprise.com.

What is claimed is:

1. A method of shipping an item, said method comprising the following steps:

receiving a first postage payment from a first entity;

receiving a first item, said first item comprising first indicia, said first indicia indicating a first e-mail address;

scanning, using an electronic scanner, said first item;

determining, using a computer processor, whether said first postage payment is sufficient;

looking up, using the computer processor, at least a portion of said first e-mail address in a first database, said first database being stored in a first computer system;

delivering said first item to a second entity, said second entity being associated with a first physical address, said first physical address being associated with said first e-mail address in said first database;

sharing revenue with a third entity, said revenue being derived at least in part from said delivering said first item, wherein:

said first entity is different from said second entity and is different from said third entity; and said second entity is different from said third entity;

wherein either said first entity, said second entity, or said third entity is a first e-mail service provider, said first e-mail service provider being the owner or registrant of a first domain name, said first e-mail address comprising said first domain name; and wherein:

said first e-mail address is associated with a first user and a second physical address in a second database;

said first database is under control of a first domain name registrar;

said second database is under control of said first e-mail service provider;

said first user is different from said first entity, said second entity, and said third entity; and said first domain name registrar is different from said first entity, said second entity, said third entity, and said first user.

2. The method in claim 1 additionally comprising the following steps:

establishing a first relationship with a first implementation service provider, said first relationship providing that some of the steps are to be performed by a first postal carrier and other steps are to be performed by said first implementation service provider.

3. The method in claim 1 additionally comprising the following step:

evaluating at least a first pricing factor, said first pricing factor being selected from the group consisting of (i) revenue model, (ii) lookup time, (iii) handoff time, (iv) failure rate , (v) cost of raising awareness, and (vi) printing costs.

4. The method in claim 1 additionally comprising the following steps:

providing for establishing a first rate, said first rate being different from a second rate and being a postage rate for items that are addressed with an email address, said second rate being a postage rate for items that are not addressed with an e-mail address.

5. The method in claim 4 wherein said first parcel further comprises second indicia, said second indicia indicating an amount paid, said amount paid being sufficient under said first rate.

6. The method in claim 1 additionally comprising the following step:

paying a commission to a first commission recipient, said commission being an incentive for facilitating delivery of a second item.

7. The method in claim 1 additionally comprising the following step:

providing a first barcode to a first shipper via a first computer network, said first barcode representing an amount of postage.

8. The method in claim 1 additionally comprising the following step:

charging for an advertisement, said first item comprising said advertisement.

9. The method in claim 1 additionally comprising the following step:

providing a fulfillment queue mechanism, said fulfillment queue mechanism being suitable for use in allowing a first user to perform a contractual duty on behalf of a second user, said contractual duty being owed by said second user to a third user, wherein:

said second user is a seller;

said first user is different from said second user; and said third user is a purchaser.

10. The method in claim 1 additionally comprising the following step:

providing a drop box mechanism, said drop box mechanism comprising a first scanning mechanism and a first weighing mechanism, said first scanning mechanism being configured to scan said first item, said first weighing mechanism being configured to weigh said first item.

11. The method in claim 1 additionally comprising the following steps:

providing for looking up a license plate in a third database; and providing for delivering a second item according to an outcome of said step of providing for looking up said license plate.

12. The method in claim 1 additionally comprising the following step:

providing a first label, said first label comprising at least a first area and a second area, said first label further comprising second indicia and third indicia, said second indicia indicating that said first area is appropriate for entry of a first type of address, said third indicia indicating that said second area is appropriate for entry of second type of address, said first type of address being different from said second type of address.

13. The method in claim 1 additionally comprising the following step:

providing a first forwarding mechanism, said first forwarding mechanism being suitable for use in allowing said second entity to forward said first item to a fourth entity, said fourth entity being associated with said first email address.

14. The method in claim 1 additionally comprising the following steps:

providing for looking up a first phone number in a third database; and providing for delivering a second item according to an outcome of said step of providing for looking up said phone number.

15. The method in claim 1 additionally Comprising the following step:

providing for receiving a first advertising payment from a first advertiser for a first advertisement, wherein:

said first advertisement appears on said first item.

16. The method in claim 1 additionally comprising the following step:

providing for receiving a first internet auction listing, said first internet auction listing being associated with a first seller; and providing a first internet auction queue mechanism, said first internet auction queue mechanism being suitable to allow a second seller to enter a first fulfillment gueue, said first fulfillment gueue being associated with said first internet auction listing;

providing for receiving a first bid, said first bid being associated with a first buyer; wherein:

said first seller and said second seller are different from each other and different from said first buyer.

17. The method in claim 1 additionally comprising the following step:

providing for enabling a first seller and a second seller to agree to a first exchange, said first exchange comprising at least a compensation commitment and a fulfillment commitment.

18. The method in claim 1 additionally comprising the following step:

providing for determining whether a first buyer is closer to a first seller than to a second seller.

19. The method in claim 1 additionally comprising the following step:

providing a first drop box mechanism, said first drop box mechanism being configured to perform a first acceptance process, said first acceptance process comprising the following steps:

providing for scanning said first item;

providing for weighing said first item;

providing for determining sufficiency of said first postage payment; and providing for performing a first completion step, said first completion step being selected from the group consisting of (i) providing for rejecting said first item and (ii) providing for accepting said first item.

20. The method in claim 1 additionally comprising the following step:

providing a fulfillment network, said fulfillment network being configured to allow a first fulfiller to provide a second item to a first buyer on behalf of a first seller, wherein:

said first seller is a seller of a third item;

said second item and said third item are fungible; and said first fulfiller is closer than is said first seller to said first buyer.

* * * * *